United States Patent
Yan et al.

(10) Patent No.: US 12,491,496 B2
(45) Date of Patent: Dec. 9, 2025

(54) SOLID AMINE ADSORBENT AND ITS PREPARATION METHOD AND APPLICATION

(71) Applicant: DECARBON TECHNOLOGY (SHENZHEN) CO., LTD., Guangdong (CN)

(72) Inventors: Feng Yan, Guangdong (CN); Zuotai Zhang, Guangdong (CN); Heijin Chen, Guangdong (CN); Jiyun Xu, Guangdong (CN)

(73) Assignee: DECARBON TECHNOLOGY (SHENZHEN) CO., LTD., Shenzhen (CN)

( * ) Notice: Subject to any disclaimer, the term of this patent is extended or adjusted under 35 U.S.C. 154(b) by 0 days.

(21) Appl. No.: 18/970,921

(22) Filed: Dec. 6, 2024

(65) Prior Publication Data
US 2025/0281902 A1 Sep. 11, 2025

(30) Foreign Application Priority Data
Mar. 6, 2024 (CN) .......................... 202410252782.1

(51) Int. Cl.
*B01J 20/30* (2006.01)
*B01D 53/62* (2006.01)
(Continued)

(52) U.S. Cl.
CPC .......... *B01J 20/3085* (2013.01); *B01D 53/62* (2013.01); *B01D 53/81* (2013.01); *B01J 20/267* (2013.01);
(Continued)

(58) Field of Classification Search
CPC .. B01J 20/3085; B01J 20/267; B01J 20/3078; B01J 20/3204; B01J 20/3253; B01J 20/3282; B01D 53/62; B01D 53/81
See application file for complete search history.

(56) References Cited

U.S. PATENT DOCUMENTS

2016/0199810 A1   7/2016   Goeppert et al.

FOREIGN PATENT DOCUMENTS

CN    106660010 A    5/2017
CN    109126744 A    1/2019
(Continued)

OTHER PUBLICATIONS

Notification to Grant Patent Right for Invention, Chinese Application No. 202410252782.1, mailed Sep. 2, 2024 (7 pages).
CNIPA, Office Action issued for Chinese Application No. 202410252782.1, mailed Jun. 13, 2024 (21 pages).
Ahmed F. Abdel-Magid et al., J. Org. Chem., "Reductive Amination of Aldehydes and Ketones with Sodium Triacetoxyborohydride. Studies on Direct and Indirect Reductive Amination Procedures", vol. 61, pp. 3849-3862, issued date Dec. 31, 1996.
(Continued)

*Primary Examiner* — James A Fiorito (57) ABSTRACT

The present disclosure a solid amine adsorbent and its preparation method and application. The solid amine adsorbent consists of modified organic amines and a porous nano support, with the proportion of secondary amines in the modified organic amines being 70% or higher. The preparation method of the modified organic amines includes the following steps: S1: Mixing the organic amine and the organic amine modifying agent into an acetonitrile solvent and stirring to achieve uniform mixing; S2: Adding a crosslinking agent to the solution and stirring; S3: Gradually adding acetic acid to the solution during stirring to adjust the pH to neutral, then continuing to stir; S4: Using a rotary evaporator to evaporate the solvent at 90-110° C. until completely removed, resulting in the modified organic amine. The modified solid amine adsorbent produced by the (Continued)

present disclosure maintains high stability during cyclic adsorption and desorption processes while also ensuring excellent capacity.

8 Claims, 3 Drawing Sheets

(51) Int. Cl.
  *B01D 53/81* (2006.01)
  *B01J 20/26* (2006.01)
  *B01J 20/32* (2006.01)
(52) U.S. Cl.
  CPC ....... *B01J 20/3078* (2013.01); *B01J 20/3204* (2013.01); *B01J 20/3253* (2013.01); *B01J 20/3282* (2013.01); *B01D 2253/202* (2013.01); *B01D 2257/504* (2013.01)

(56) References Cited

FOREIGN PATENT DOCUMENTS

| | | |
|---|---|---|
| CN | 110368904 A | 10/2019 |
| CN | 116510693 A | 8/2023 |
| CN | 117599751 A | 2/2024 |

OTHER PUBLICATIONS

Ahmed F. Abdel-Magid et al., Organic Process Research & Development, "A Review on the Use of Sodium Triacetoxyborohydride in the Reductive Amination of Ketones and Aldehydes", vol. 10, pp. 971-1031, issued date Dec. 31, 2006.

Xuehua Shen et al., Bulletin of Science, "Research Progress on the Problem of CO2-Induced Deactivation of Solid Amine Adsorbents", vol. 10, Issue 13, pp. 1637-1652, issued date Jan. 19, 2023.

SOLID AMINE ADSORBENT AND ITS PREPARATION METHOD AND APPLICATION

FIELD OF THE INVENTION

The present disclosure relates to the technical field of solid amine adsorbents, specifically to a solid amine adsorbent and its preparation method and application.

BACKGROUND OF THE INVENTION

Currently, global $CO_2$ emissions continue to rise, further exacerbating the risks of climate change and threats to the ecological environment. $CO_2$ capture, utilization, and storage (CCUS) technologies have gained significant attention from scientists as an important means to address global climate change. Among these, $CO_2$ capture serves as a leading and critical technology capable of capturing large amounts of $CO_2$ produced by industries such as manufacturing and power generation, enabling efficient separation and recovery of $CO_2$ to effectively control emission levels.

Solid amine $CO_2$ adsorption technology is characterized by efficient adsorption, low energy consumption, low cost, and simplicity of process, making it a promising carbon capture technology. Organic amines, as components that directly react with $CO_2$ in solid amine adsorbents, play a decisive role in the performance of the adsorbent. In practical $CO_2$ capture processes, the primary and secondary amine groups on organic amine molecules can react with $CO_2$ in a 2:1 molar ratio to form reversible carbamate or carbamic ester products. After a thermal desorption reaction, the adsorbed $CO_2$ can be separated, regenerating the primary and secondary amine groups. To achieve $CO_2$ enrichment and efficient utilization of organic amines, the adsorbent needs to employ pure $CO_2$ as a purge gas for desorption reactions at high temperatures. However, in high-temperature environments, organic amines tend to volatilize from the surface of the adsorbent due to poor thermal stability, leading to physical amine deactivation. When using pure $CO_2$ as the purge gas, the concentration gradient makes it difficult for the adsorbed $CO_2$ to desorb from the adsorbent, resulting in further reactions that generate irreversible compounds, which deactivate the amine groups on the organic amine, causing chemical deactivation of the adsorbent. To address the significant issues of physical and chemical deactivation faced by organic amines, extensive research has been conducted by many scholars to tackle the amine deactivation of adsorbents in order to promote the industrial application of solid amine adsorption methods. However, most studies tend to lead to a decrease in the capacity of the adsorbents, with single-cycle adsorption capacities dropping by more than 50% in some cases. Current research primarily employs methods that sacrifice adsorption performance to enhance cyclic stability, which poses substantial limitations for practical industrial applications. Therefore, the development of a solid amine adsorbent with excellent thermal and chemical stability while maintaining high capacity, with a secondary amine ratio of 70% or higher, represents a critical technical breakthrough needed to advance the industrial application of solid-state amine adsorbents.

SUMMARY OF THE INVENTION

To address the deficiencies in the prior art, the present disclosure proposes a solid amine adsorbent, its preparation method, and applications.

According to the present disclosure, there is provided a solid amine adsorbent comprising modified organic amines and a porous nano support, wherein the loading amount of the modified organic amine in the adsorbent ranges from 10 wt. % to 80 wt. %; the proportion of secondary amines in the modified organic amine is 70% or higher.

The preparation method of the modified organic amine includes the following steps:
   S1: Mix organic amines and organic amine modifiers into a solvent of acetonitrile in a volume ratio of 5-15 times, and stir at a temperature of 25-60° C. at 300-600 rpm for 3-5 minutes until uniformly mixed;
   S2: Add a crosslinking agent to the solution and stir at room temperature at 300-1500 rpm for 5-20 hours;
   S3: During the stirring process at 300-600 rpm, gradually add acetic acid dropwise to adjust the pH of the solution, maintaining it in the neutral range of pH 6.5-7.5, and continue stirring for 15-60 minutes;
   S4: Use a rotary evaporator to evaporate the solvent from the solution at 90-110° C. until complete evaporation occurs, yielding the modified organic amine as the final product;
Wherein the organic amine modifiers are selected from any one of acetaldehyde, propanal, cyclopentanone, cyclohexanone, acetone, 3-pentanone, or cyclohexanone;
   the crosslinking agents are selected from any one of triacetoxy borohydride sodium (($CH_3COO$)3BHNa), sodium cyanoborohydride ($NaBH_3CN$), or borane-2-methylpyridine complex ($C_6H_{10}BN$);
   the molar ratio of organic amine to organic amine modifier is 1: (1-4);
   and the loading amount of the modified organic amine in the adsorbent is 10 wt. % to 80 wt. %.

The modification method for organic amines in the adsorbent involves a reduction reaction of aldehydes or ketones on the primary amine groups of the organic amines, utilizing mild crosslinking agents to alkylate the primary amines into secondary amines.

Compared to the highly reactive epoxide compounds, this method employs aldehyde or ketone compounds as modifying agents while using mild crosslinking agents to achieve the targeted modification of organic amines, converting only the highly reactive primary amine groups to secondary amines. The existing secondary amine groups, due to their lower reactivity and the steric hindrance effect of the carbon chains, further restrict the progress of the grafting modification reaction. Additionally, during the reaction process, the dropwise addition of acetic acid to maintain the pH within the neutral range of 6.5-7.5 ensures the conversion of primary amines to secondary amines while limiting the conversion of secondary amines to tertiary amines.

Figure 1:
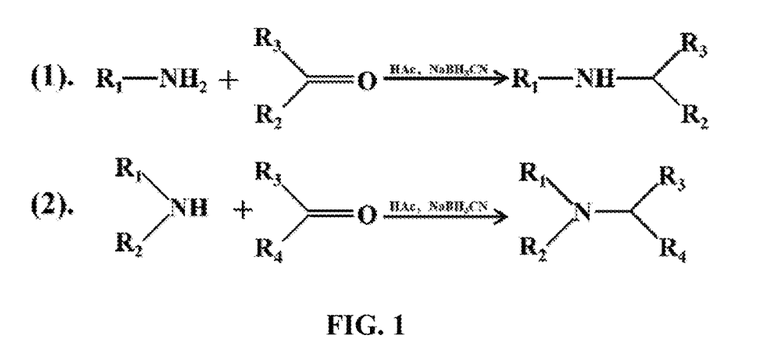
FIG. 1 is a schematic diagram of the organic amine modification process of the present disclosure.
Figure 2:
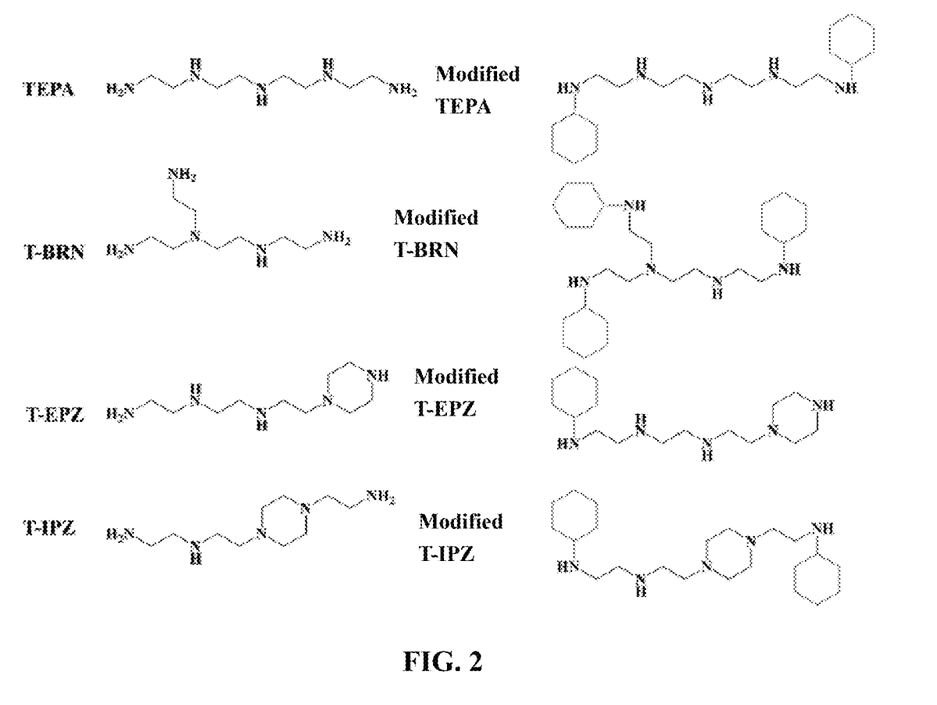
FIG. 2 is a schematic diagram of the molecular structures of the main isomers of unmodified TEPA in Comparative Example 1 and modified TEPA in Embodiment 1 of the present disclosure.
Figure 3:
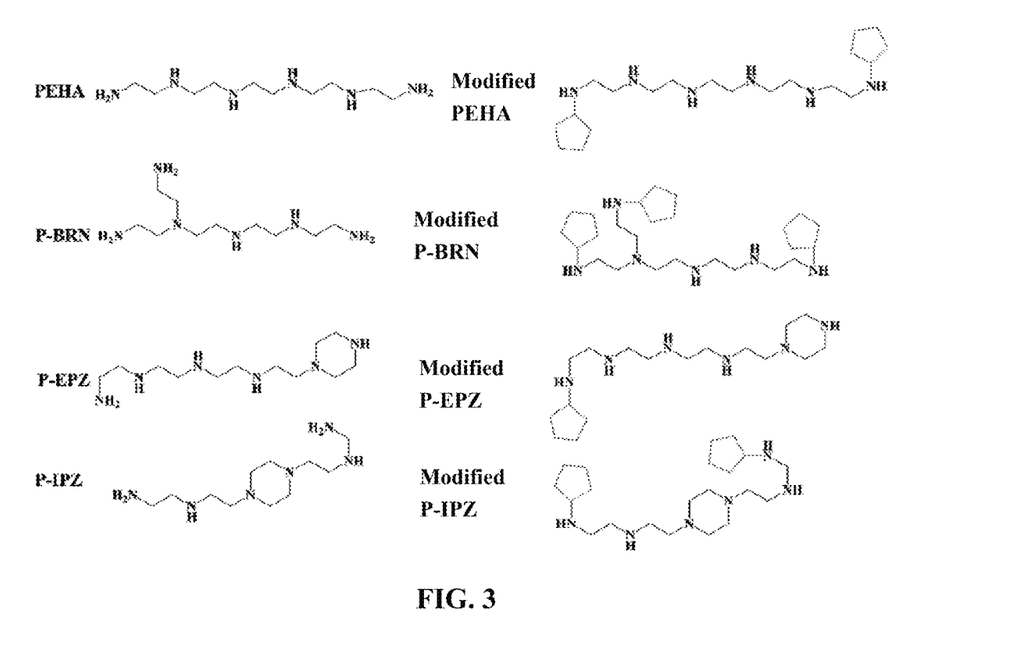
FIG. 3 is a schematic diagram of the molecular structures of the main isomers of unmodified PEHA in Comparative Example 2 and modified PEHA in Embodiment 2 of the present disclosure.
Figure 4:
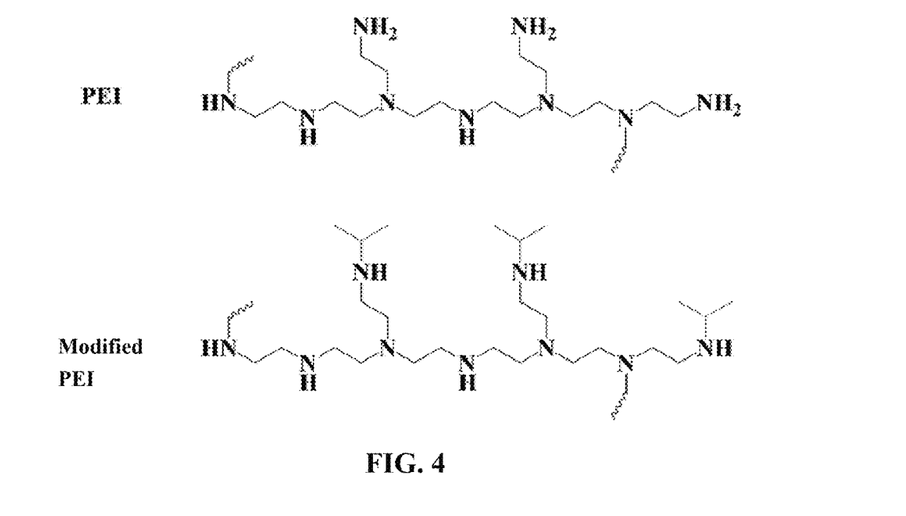
FIG. 4 is a schematic diagram of the molecular structures of unmodified B-PEI-1200 in Comparative Example 3 and modified B-PEI-1200 in Embodiment 3 of the present disclosure.

The modification reaction pathway is illustrated in FIG. 1. The modification method targets linear organic amine molecules containing primary, secondary, and tertiary amines, with reaction (1) as the main reaction while reaction (2) occurs negligibly. As a result, the conversion rate of primary amines exceeds 80%, and the conversion rate of secondary amines remains below 10%. During the modification process, the molecular weight of the organic amines increases, enhancing their thermal stability and thereby expanding their applicable environments and fields. Additionally, the conversion of primary amines to secondary amines during the modification significantly increases the proportion of more stable secondary amines in the organic amine molecules. This shift allows the reaction during $CO_2$ desorption to proceed towards desorption rather than forming irreversible compounds. Finally, since secondary amines are almost completely retained during the modification process, the decrease in adsorption performance of the organic amine is minimal, allowing the amine efficiency to remain at a high level. This is of significant importance for advancing the industrial application of solid amine adsorbents in $CO_2$ capture.

Furthermore, the organic amines are selected from any one of diethylenetriamine (DETA), triethylenetetramine (TETA), tetraethylenepentamine (TEPA), pentaethylenehexamine (PEHA), or polyethyleneimine (PEI). To ensure that the viscosity and amine density of the modified polyethyleneimine remain within usable ranges, the polyethyleneimine is a branched or linear polymer with a weight-average molecular weight ranging from 300 to 2500, preferably between 600 and 1200. Furthermore, the molar ratio of organic amines to crosslinking agents is 1:(1-4). According to the present disclosure, there is provided a preparation method for the solid amine adsorbent, comprising the following steps:

S1: Dissolve the dried modified organic amines in a sodium hydroxide solution with a concentration of 0.5-3.0 mol/L and extract 2-10 times until extraction is complete;

S2: After mixing all extracted phases, add the porous nano support and use a rotary evaporator to evaporate the solvent at 40-140° C. until complete solvent removal, yielding product 1;

S3: Dry product 1 in a vacuum drying oven at a temperature of 40-140° C. for 4-12 hours to obtain the solid amine adsorbent.

Further, the alkaline solution may be selected from any one of sodium hydroxide, potassium hydroxide, barium hydroxide, or ammonium hydroxide.

The volume of the alkaline solution is 1-3 times the volume fraction of acetonitrile.

The extracting agent can be any one of ethyl acetate, ether, diisopropyl ether, or isoamyl alcohol.

The amount of the extracting agent used at one time is 0.5-3 times the volume fraction of acetonitrile.

The porous nano support is selected from any one of silica, alumina, zeolite molecular sieves, resins, or metal-organic frameworks (MOFs).

There is also provided applications of the solid amine adsorbent in the field of $CO_2$ adsorption.

In summary, compared with the prior art, the present disclosure achieves the following technical effects:

(1) The solid amine adsorbent prepared by the present disclosure maintains high stability of organic amines during desorption while ensuring stability in adsorption capacity;

(2) In the preparation method of the present disclosure, the conversion rate of primary amines is consistently above 80%, while the conversion rate of secondary amines remains below 10%.

(3) The modified organic amines in the solid amine adsorbent prepared by the present disclosure have a secondary amine proportion of 70% or higher, ensuring high stability;

(4) The solid amine adsorbent prepared by the invention maintains stable adsorption capacity even after 10 cycles.

BRIEF DESCRIPTION OF THE DRAWINGS

To clarify the technical solutions of the embodiment of the present disclosure, the following is a brief introduction to the drawings used in the embodiment. It should be understood that the following figures illustrate only certain embodiments of the present disclosure and should not be construed as a limitation on the scope. Those skilled in the art can derive other related figures without creative effort based on these figures.

SPECIFIC EMBODIMENT

To facilitate a better understanding of the invention by those skilled in the art, the following describes the technical solutions of the embodiments of the present disclosure in conjunction with the accompanying drawings. It is evident that the described embodiments are merely part of the embodiments of the invention and do not represent all possible embodiments. All other embodiments derived by those skilled in the art without the need for creative effort based on the embodiments of the present disclosure shall fall within the protection scope of this invention.

I. Sources of Materials for Embodiments and Comparative Examples

Glycerol: CAS: 6-81-5, Shanghai Hushi;
B-PEI-300: CAS: 9002-98-6, Thermo Fisher Chemical;
B-PEI-1200: CAS: 9002-98-6, Thermo Fisher Chemical;
B-PEI-600: CAS: 9002-98-6, Thermo Fisher Chemical;
B-PEI-1800: CAS: 9002-98-6, Thermo Fisher Chemical;
TEPA: CAS: 112-57-2, Shanghai Aladdin;
PEHA: CAS: 4067-16-7, Shanghai Aladdin;
$NaBH_3CN$: CAS: 25895-60-7, Shanghai Aladdin;
$(CH_3COO)_3BHNa$: CAS: 56553-60-7, Vokai;
Borane-2-methylpyridine complex ($C_6H_{10}BN$): CAS: 3999-38-0; Alfa
Sodium hydroxide: CAS: 1310-73-2, Shanghai Aladdin;
Acetonitrile: CAS: 75-05-8, Shanghai Aladdin;
Diethyl ether: CAS: 2679-89-2, Shanghai Aladdin;
Ethyl acetate: CAS: 141-78-6, Shanghai Aladdin;
Acetone: CAS: 127-06-0, Shanghai Aladdin;
Cyclopentanone: CAS: 120-92-3, Shanghai Aladdin;
Cyclohexanone: CAS: 108-94-1, Shanghai Aladdin;
Propylene oxide: CAS: 75-56-9, Vokai;
Methanol: CAS: 67-56-1, Shanghai Hushi.

Performance Testing Methods (1) Solid Amine $CO_2$ Adsorbent Cycling Adsorption Method: A 15 mg sample of the prepared adsorbent is subjected to adsorption testing using a thermogravimetric analyzer. The adsorption temperature and atmosphere are set at 60° C. and 15% $CO_2$, with an adsorption time of 60 minutes. The desorption temperature and atmosphere are 150° C. and 100% $CO_2$, with a desorption time of 30 minutes. This adsorption-desorption cycle is repeated 10 times.

(2) Proportion Testing Method for Modified Organic Amines: The proportions of primary, secondary, and tertiary amines in the organic amine molecules are tested using a liquid-state 13C nuclear magnetic resonance (NMR) spectrometer (Bruker, Ascend TM500 MHz, Germany). The inverse-gated decoupling pulse method is employed for quantitative analysis of the 13C spectrum, and the distribution of primary, secondary, and tertiary amines is calculated based on the area integral corresponding to the characteristic carbon atoms.

(3) Conversion Rate Testing During Organic Amine Modification:

Primary amine to secondary amine conversion rate=
(initial primary amine ratio−final primary amine ratio)/initial primary amine ratio Secondary amine to tertiary amine conversion rate=
(final tertiary amine ratio−initial tertiary amine ratio)/initial secondary amine ratio;

(4) $CO_2$ Adsorption Capacity Testing: The $CO_2$ capacity of the adsorbent is measured using a Setsys EVO Easy 1750 thermogravimetric analyzer (TGA; SETARAM, France).

A sample of 15-25 mg of the adsorbent is first treated under a 100% Ar atmosphere at 150° C. for 30 minutes to obtain the initial mass (M1). The mass after switching to a 60° C. and 15% $CO_2$ atmosphere for 60 minutes is recorded as the saturated mass (M2). The adsorption amount Q (in mmol/g of adsorbent) is calculated using the following formula:

$$Q = \frac{M2 - M1}{M1 * 44} * 1000$$

Embodiment 1

This embodiment of the solid amine adsorbent includes steps for organic amine modification and adsorbent preparation:
Organic Amine Modification:
S1: Add 11.4 g of TEPA and 9.80 g of cyclohexanone (molar ratio 1.2:2) to 200 mL of acetonitrile solvent, and stir at 400 rpm for 3 minutes at 25° C. to ensure uniform mixing;
S2: Add 6.30 g of $NaBH_3CN$ (molar ratio to TEPA is 2:1) into the solution, stirring at room temperature at 1000 rpm for 10 hours;
S3: During stirring at 300 rpm, gradually add acetic acid to the solution to adjust the pH to 7.0, and continue stirring for 30 minutes;
S4: Use a vacuum rotary evaporator to evaporate the solution at 100° C. until the solvent is completely removed, yielding the modified organic amine;
Adsorbent Preparation:
S5: Dissolve the dried modified organic amine in 200 mL of 1.0 mol/L sodium hydroxide solution, extracting four times with 100 mL of ether each time;
S6: Combine all extracted phases, add 9.45 g of silica support, and use a vacuum rotary evaporator to evaporate at 40° C. until the solvent is completely removed, yielding product 1;
S7: Dry product 1 in a vacuum drying oven at 40° C. for 6 hours to obtain a solid amine $CO_2$ adsorbent with an organic amine loading of 50 wt. %.

Embodiment 2

This embodiment of the solid amine adsorbent includes steps for organic amine modification and adsorbent preparation:
Organic Amine Modification:
S1: Add 11.6 g of PEHA and 14.7 g of cyclopentanone (molar ratio 1:3.5) to 300 mL of acetonitrile solvent, and stir at 500 rpm for 3 minutes at 35° C. for uniform mixing;
S2: Add 9.45 g of $NaBH_3CN$ (molar ratio to PEHA is 3:1) into the solution, stirring at room temperature at 1000 rpm for 15 hours;
S3: During stirring at 500 rpm, gradually add acetic acid to adjust the solution pH to 7.0, maintaining neutrality, and continue stirring for 30 minutes;
S4: Use a vacuum rotary evaporator to evaporate the solution at 100° C. until the solvent is completely removed, yielding the modified organic amine;
Adsorbent Preparation:
S5: Dissolve the dried substrate in 300 mL of 1.5 mol/L sodium hydroxide solution, extracting three times with 200 mL of ethyl acetate each time;
S6: Combine all extracted phases, add aluminum oxide support, and use a vacuum rotary evaporator to evaporate at 85° C. until the solvent is completely removed, yielding product 1;
S7: Dry product 1 in a vacuum drying oven at 85° C. for 4 hours to obtain a solid amine $CO_2$ adsorbent with an organic amine loading of 50 wt. %.

Figure 5:
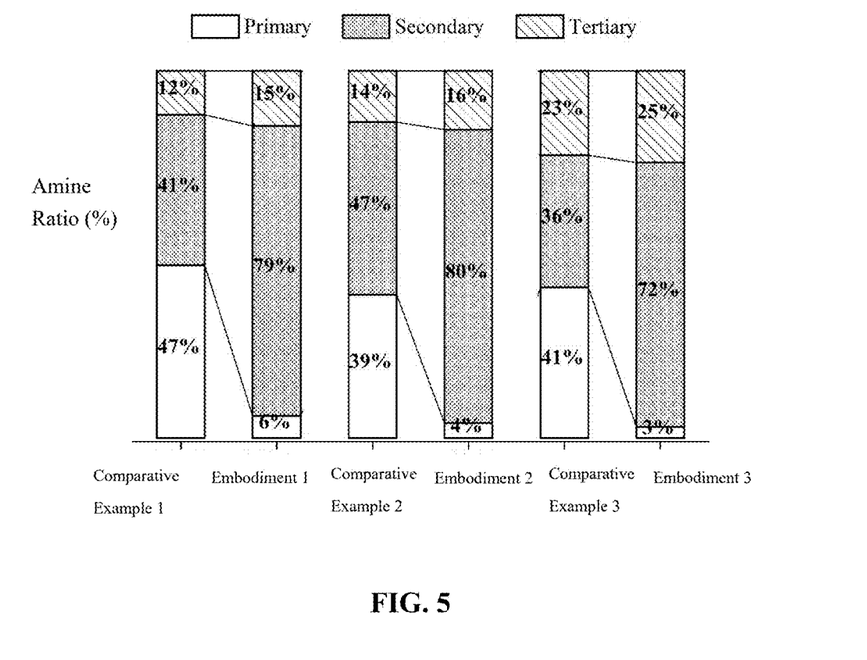
FIG. 5 presents the distribution of primary, secondary, and tertiary amine ratios for organic amines in Embodiments 1-3 and Comparative Examples 1-3.

In this embodiment, the modified organic amine's ratio of primary, secondary, and tertiary amines is 4:80:16. As shown in FIG. 5, the conversion rate of primary amines to secondary amines is 89.7%, while the conversion rate of secondary amines to tertiary amines is only 4.3%. The prepared $CO_2$ adsorbent shows an initial $CO_2$ adsorption capacity of 3.72 mmol/g and a tenth cycle capacity of 3.55 mmol/g, retaining 95.4% of its adsorption capacity. These results indicate that the modified organic amine and the resulting $CO_2$ adsorbent exhibit excellent stability while maintaining high capacity.

Embodiment 3

This embodiment of the solid amine adsorbent includes steps for organic amine modification and adsorbent preparation:
Organic Amine Modification:
S1: Add 4.3 g of branched polyethyleneimine (B-PEI-1200) with a weight-average molecular weight of 1200 and 8.7 g of acetone (molar ratio 1:1.5) to 100 mL of acetonitrile solvent, stirring at 500 rpm for 5 minutes at 50° C. to ensure uniform mixing;
S2: Add 9.45 g of $NaBH_3CN$ (molar ratio to polyethyleneimine is 1.5:1) into the solution, stirring at room temperature at 1000 rpm for 20 hours;
S3: During stirring at 500 rpm, gradually add acetic acid to the solution to adjust the pH to 7.0, and continue stirring for 30 minutes;
S4: Use a vacuum rotary evaporator to evaporate the solution at 100° C. until the solvent is completely removed, yielding the modified organic amine;

Adsorbent Preparation:
- S5: Dissolve the dried substrate in 200 mL of 2.0 mol/L sodium hydroxide solution, extracting five times with 50 mL of ether each time;
- S6: After mixing all extracted phases, add a resin support and use a vacuum rotary evaporator to evaporate at 45° C. until the solvent is completely removed, yielding the modified organic amine product;
- S7: Dry the synthesized product in a vacuum drying oven at 45° C. for 6 hours to obtain a solid amine $CO_2$ adsorbent with an organic amine loading of 50 wt. %.

Embodiment 4

The method for organic amine modification and adsorbent preparation is consistent with Embodiment 1, except that the amounts used for TEPA, cyclohexanone, and $NaBH_3CN$ are 9.45 g, 14.7 g, and 9.45 g (molar ratio 1:3:3).

Embodiment 5

The method for organic amine modification and adsorbent preparation is consistent with Embodiment 2, except that the amounts used for PEHA, cyclopentanone, and $NaBH_3CN$ are 11.6 g, 16.8 g, and 12.6 g (molar ratio 1:4:4).

Embodiment 6

The method for organic amine modification and adsorbent preparation is consistent with Embodiment 3, except that the amounts used for branched polyethyleneimine (B-PEI-1200), acetone, and $NaBH_3CN$ are 4.3 g, 5.8 g, and 6.3 g (molar ratio 1:1:1).

Embodiment 7

The method for organic amine modification and adsorbent preparation is consistent with Embodiment 3, except that the porous nano support used is silica.

Embodiment 8

The method for organic amine modification and adsorbent preparation is consistent with Embodiment 3, except that the porous nano support used is aluminum oxide.

Embodiment 9

The method for organic amine modification and adsorbent preparation is consistent with Embodiment 3, except that the porous nano support used is a zeolite molecular sieve.

Embodiment 10

The method for organic amine modification and adsorbent preparation is consistent with Embodiment 6, except that the organic amine used is branched polyethyleneimine (B-PEI-1800) with a weight-average molecular weight of 1800.

Embodiment 11

The method for organic amine modification and adsorbent preparation is consistent with Embodiment 6, except that the organic amine used is branched polyethyleneimine (B-PEI-600) with a weight-average molecular weight of 600.

Embodiment 12

The method for organic amine modification and adsorbent preparation is consistent with Embodiment 6, except that the organic amine used is branched polyethyleneimine (B-PEI-300) with a weight-average molecular weight of 300.

Embodiment 13

The method for organic amine modification and adsorbent preparation is consistent with Embodiment 3, except that the crosslinking agent used is $(CH_3COO)_3BHNa$.

Comparative Example 1

Comparing Comparative Example 1 with Embodiment 1, the organic amine was not modified and the adsorbent was prepared directly:
- S1: Mix 9.45 g of TEPA with 400 mL of ether, then add 9.45 g of silica support. Use a vacuum rotary evaporator at 45° C. until the solvent completely evaporates to obtain Product 1;
- S2: Dry Product 1 in a vacuum oven at 45° C. for 6 hours to prepare a solid amine $CO_2$ adsorbent with an organic amine loading of 50 wt. %.

Comparative Example 2

Comparing Comparative Example 2 with Embodiment 2, the organic amine was not modified and the adsorbent was prepared directly:
- S1: Mix 11.6 g of PEHA with 600 mL of ethyl acetate, then add 11.6 g of aluminum oxide support. Use a vacuum rotary evaporator at 85° C. until the solvent completely evaporates to obtain Product 1;
- S2: Dry Product 1 in a vacuum oven at 85° C. for 4 hours to prepare a solid amine $CO_2$ adsorbent with an organic amine loading of 50 wt. %.

Comparative Example 3

Comparing Comparative Example 3 with Embodiment 3, the organic amine was not modified and the adsorbent was prepared directly:
- S1: Mix 4.3 g of B-PEI-1200 with 250 mL of ether, then add 4.3 g of resin support. Use a vacuum rotary evaporator at 45° C. until the solvent completely evaporates to obtain Product 1;
- S2: Dry Product 1 in a vacuum oven at 45° C. for 6 hours to prepare a solid amine $CO_2$ adsorbent with an organic amine loading of 50 wt. %.

Comparative Example 4

Comparing Comparative Example 4 with Embodiment 3, the organic amine modification and adsorbent preparation methods are consistent. The difference lies in the use of 8.6 g of B-PEI-1200 along with 2.32 g of acetone and 2.52 g of $NaBH_3CN$ (molar ratio 1:0.2:0.2).

Comparative Example 5

Comparing Comparative Example 5 with Embodiment 3, the adsorbent preparation methods are consistent. The difference is that in step S3 of the organic amine modification, the reaction pH is controlled at 4.

Comparative Example 6

Comparing Comparative Example 6 with Embodiment 1, the adsorbent preparation methods are consistent. The difference lies in the organic amine modification method, which uses an epoxy propane ring-opening grafting method. Epoxy propane and TEPA are mixed in a molar ratio of 2:1 and added to 10 times the volume of methanol. After stirring at room temperature for 12 hours, a modified organic amine methanol solution is obtained. This solution is combined with a silica support and subjected to vacuum rotary evaporation at 70° C. until the solvent completely evaporates. The residual substrate is then dried in a vacuum oven at 70° C. for 4 hours, resulting in a solid amine $CO_2$ adsorbent with an amine loading of 50 wt. %.

amounts of the modifying agent and crosslinking agent led to incomplete conversion of primary amines to secondary amines, resulting in inadequate stability during the cycling of the adsorbents. In Comparative Example 5, the organic amine modification occurred in a slightly acidic environment, inhibiting the conversion of primary amines to secondary amines, resulting in poor stability of the prepared organic amines and $CO_2$ adsorbents. In Comparative Example 6, the epoxy propylene ring-opening grafting method used for organic amine modification resulted in a 25.1% decrease in initial adsorption capacity of the $CO_2$

TABLE 1

Test Results of Embodiments and Comparative Examples

| Item | Primary Amine (%) | Secondary Amine (%) | Tertiary Amine (%) | Primary Amine Conversion Rate (%) | Secondary Amine Conversion Rate (%) | Initial Adsorption Capacity (mmol/g) | Adsorption Capacity after 10 Cycles (mmol/g) | Remaining Adsorption Capacity (%) |
|---|---|---|---|---|---|---|---|---|
| Embodiment 1 | 6 | 79 | 15 | 87.2 | 7.3 | 4.63 | 4.35 | 94.0 |
| Embodiment 2 | 4 | 80 | 16 | 89.7 | 4.3 | 3.72 | 3.55 | 95.4 |
| Embodiment 3 | 3 | 72 | 25 | 92.7 | 5.6 | 2.69 | 2.62 | 97.4 |
| Embodiment 4 | 4 | 83 | 13 | 91.5 | 2.4 | 4.65 | 4.39 | 94.4 |
| Embodiment 5 | 3 | 82 | 15 | 92.3 | 2.1 | 3.74 | 3.6 | 96.3 |
| Embodiment 6 | 5 | 71 | 24 | 87.8 | 2.8 | 2.7 | 2.61 | 96.7 |
| Embodiment 7 | 3 | 72 | 25 | 92.7 | 5.6 | 2.72 | 2.62 | 96.3 |
| Embodiment 8 | 2 | 73 | 25 | 95.1 | 5.6 | 2.72 | 2.65 | 97.4 |
| Embodiment 9 | 4 | 71 | 25 | 90.2 | 5.6 | 2.7 | 2.6 | 96.3 |
| Embodiment 10 | 2 | 70 | 28 | 89.1 | 3.9 | 2.59 | 2.55 | 98.5 |
| Embodiment 11 | 6 | 75 | 19 | 87.0 | 5.8 | 2.88 | 2.77 | 96.2 |
| Embodiment 12 | 7 | 76 | 17 | 86.1 | 6.7 | 3.57 | 3.37 | 94.4 |
| Embodiment 13 | 4 | 80 | 16 | 90.7 | 4.4 | 3.22 | 3.02 | 93.8 |
| Comparative Example 1 | 47 | 41 | 12 | / | / | 4.66 | 0.66 | 14.2 |
| Comparative Example 2 | 39 | 47 | 14 | / | / | 3.74 | 0.77 | 20.6 |
| Comparative Example 3 | 41 | 36 | 23 | / | / | 2.73 | 0.89 | 32.6 |
| Comparative Example 4 | 20 | 56 | 24 | 51.2 | 2.8 | 2.71 | 2.14 | 79.0 |
| Comparative Example 5 | 27 | 60 | 13 | 42.6 | 2.4 | 4.63 | 3.55 | 76.7 |
| Comparative Example 6 | 12 | 60 | 28 | 74.5 | 39.0 | 3.49 | 3.29 | 94.3 |

In Embodiments 1-13, the organic amines underwent modification, resulting in a conversion rate of primary amines to secondary amines exceeding 85%, while the conversion rate of secondary amines to tertiary amines did not exceed 7.3%. The modified organic amines achieved a secondary amine proportion of 70% or higher. The solid amine adsorbents derived from these modified organic amines exhibited high stability, maintaining over 93% of their remaining adsorption capacity after 10 cycles. Additionally, the adsorbents demonstrated high adsorption capacity, indicating that the modified solid amine adsorbents obtained through the formulation and preparation methods described herein effectively balance thermal and chemical stability with capacity, offering a significant advantage over the comparative examples and meeting the high standards demanded by customers and the market.

In Comparative Examples 1-3, no organic amine modification was performed. The resulting solid amine adsorbents had a high proportion of primary amines, leading to a significant rate of amine deactivation during cycling. After 10 cycles, the remaining adsorption capacity was only between 14.2% and 32.6%, indicating poor stability of the $CO_2$ adsorbents prepared from unmodified organic amines during cycling. In Comparative Example 4, insufficient adsorbents compared to Comparative Example 1. This demonstrated a noticeable reduction in amine utilization efficiency. In contrast, the $CO_2$ adsorbents prepared from the modified amines in Embodiment 1 of this application maintained nearly unchanged initial adsorption capacity compared to the unmodified Comparative Example 1, illustrating that the modified method proposed in this application effectively achieves both stability and adsorption performance.

The above description is merely a preferred embodiment of the present disclosure and should not be construed as limiting. Any modifications, equivalent replacements, or improvements made within the spirit and principles of this invention shall be included within the scope of protection of the present disclosure.

What is claimed is:
1. A solid amine adsorbent for CO2 adsorption, comprising: modified organic amines and a porous nano carrier; wherein a proportion of secondary amines in the modified organic amines is 70% or higher; a loading amount of the modified organic amines in the adsorbent is 10 wt. % to 80 wt. %, the modified organic amines are prepared by following steps:
 S1: mixing organic amines and organic amine modifiers into a solvent of acetonitrile in a volume of 5-15 times, and stir at a temperature of 25-60° C. at 300-600 rpm for 3-5 minutes until uniformly mixed;

S2: adding a crosslinking agent to the solution and stirring at room temperature at a speed of 300-1500 rpm for 5-20 hours;

S3: during the stirring process at 300-600 rpm, gradually add acetic acid dropwise to adjust the pH of the solution, maintaining it in the neutral range of pH 6.5-7.5, and continue stirring for 15-60 minutes;

S4: using a rotary evaporator to evaporate the solvent at 90-110° C. until completely removed, resulting in the modified organic amine;

wherein the organic amine modifiers are selected from any one of acetaldehyde, propanal, cyclopentanone, acetone, 3-pentanone, or cyclohexanone;

the crosslinking agent is selected from any one of triacetoxyborohydride sodium, cyanoborohydride sodium, or borane-2-methylpyridine complex;

the molar ratio of the organic amine to the organic amine modifying agent is 1:(1-4);

the molar ratio of the organic amine to the organic amine crosslinking agent is 1:(1-4).

2. The solid amine adsorbent according to claim 1, wherein the organic amine is selected from any one of diethylenetriamine, triethylenetetramine, tetraethylenepentamine, pentaethylenehexamine, or polyethyleneimine.

3. The solid amine adsorbent according to claim 1, wherein the solid amine adsorbent is prepared by following steps:

S1: dissolving the dried modified organic amines in a sodium hydroxide solution with a concentration of 0.5-3.0 mol/L and extract 2-10 times until extraction is complete;

S2: after mixing all extraction phases, adding the porous nano carrier, and using a rotary evaporator to evaporate at 40-140° C. until the solvent is completely removed to obtain Product 1;

S3: drying product 1 in a vacuum drying oven at a temperature of 40-140° C. for 4-12 hours to obtain the solid amine adsorbent.

4. The solid amine adsorbent according to claim 3, wherein the alkaline solution is any one of sodium hydroxide, potassium hydroxide, barium hydroxide, or ammonia solution.

5. The solid amine adsorbent according to claim 3, wherein the volume of the alkaline solution is 1 to 3 times the volume of acetonitrile.

6. The solid amine adsorbent according to claim 3, wherein the extraction agent is any one of ethyl acetate, ether, diisopropyl ether, or isoamyl alcohol.

7. The solid amine adsorbent according to claim 3, wherein the single-use amount of the extraction agent is 0.5 to 3 times the volume of acetonitrile.

8. The solid amine adsorbent according to claim 3, wherein the porous nano carrier is any one of silica, alumina, zeolite molecular sieves, resins, or MOFs.

* * * * *